US012794078B2

(12) United States Patent
Qiu et al.

(10) Patent No.: US 12,794,078 B2
(45) Date of Patent: Nov. 10, 2026

(54) POLYMER BINDER, LAMINATED POROUS FILM, BATTERY, AND ELECTRONIC APPARATUS

(71) Applicant: Ningde Amperex Technology Limited, Ningde City (CN)

(72) Inventors: Bin Qiu, Ningde City (CN); Xiaohe Fan, Ningde City (CN); Zengbin Wei, Ningde City (CN)

(73) Assignee: NINGDE AMPEREX TECHNOLOGY LIMITED, Ningde City (CN)

( * ) Notice: Subject to any disclaimer, the term of this patent is extended or adjusted under 35 U.S.C. 154(b) by 713 days.

(21) Appl. No.: 18/129,410

(22) Filed: Mar. 31, 2023

(65) Prior Publication Data

US 2023/0344077 A1 Oct. 26, 2023

Related U.S. Application Data

(63) Continuation of application No. PCT/CN2020/135004, filed on Dec. 9, 2020.

(51) Int. Cl.

*H01M 50/42* (2021.01)
*C08F 212/08* (2006.01)

(Continued)

(52) U.S. Cl.

CPC ........... *H01M 50/42* (2021.01); *C08F 212/08* (2013.01); *C08F 220/14* (2013.01); (Continued)

(58) Field of Classification Search

CPC .... C08F 220/14; C08F 220/18; C08F 212/08; C08F 2800/20; C08F 236/06; C08F 236/08; C08F 236/10; C08F 236/12

See application file for complete search history.

(56) References Cited

U.S. PATENT DOCUMENTS 4,315,085 A * 2/1982 Ozari .................... C08F 285/00 525/902
6,319,966 B1 * 11/2001 Kang .................... C08F 285/00 525/71

(Continued)

FOREIGN PATENT DOCUMENTS

CN 101073169 A 11/2007
CN 101276895 A 10/2008

(Continued)

OTHER PUBLICATIONS

International Search Report dated Sep. 8, 2021, issued in counterpart Application No. PCT/CN2020/135004, with English translation. (9 pages).

(Continued)

*Primary Examiner* — Amanda C. Walke
(74) *Attorney, Agent, or Firm* — WHDA, LLP

(57) ABSTRACT

A polymer binder having softening point of 60° C. to 100° C. including a copolymer formed by polymerizing a first monomer, a second monomer, and a third monomer. The first monomer includes at least one of compounds shown in formula (I) or formula (II). The second monomer includes at least one of compounds shown in formula (III) or formula (IV). The third monomer includes at least one of compounds shown in formula (V):

(I)

(II)

(Continued)

-continued (III)

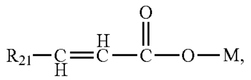

(IV)

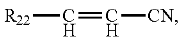

(V)

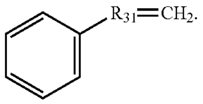

$R_{11}$ is selected from an alkyl group having 0 to 3 carbon atoms; n1 is an integer between 2 and 5; $R_{21}$ is selected from hydrogen or an alkyl group having 1 to 5 carbon atoms, and M is hydrogen or an alkali metal cation; $R_{22}$ is selected from hydrogen or an alkyl group having 1 to 5 carbon atoms; and $R_{31}$ is selected from an alkyl group having 1 to 5 carbon atoms.

18 Claims, 3 Drawing Sheets

(51) Int. Cl.

| | |
|---|---|
| ***C08F 220/14*** | (2006.01) |
| ***C08F 236/10*** | (2006.01) |
| ***C09C 3/10*** | (2006.01) |
| ***H01M 50/446*** | (2021.01) |
| ***H01M 50/449*** | (2021.01) |

(52) U.S. Cl.

CPC .............. *C08F 236/10* (2013.01); *C09C 3/10* (2013.01); *H01M 50/446* (2021.01); *H01M 50/449* (2021.01); *C08F 2800/20* (2013.01)

(56) References Cited

U.S. PATENT DOCUMENTS

| | | | | |
|---|---|---|---|---|
| 7,319,114 | B2 * | 1/2008 | Ohmura | C08J 3/128<br>521/64 |
| 8,841,031 | B2 * | 9/2014 | Kim | H01M 50/446<br>429/251 |
| 9,637,067 | B2 * | 5/2017 | Kohlstrung | F16J 15/064 |
| 2003/0064314 | A1 * | 4/2003 | VanDusen | G03G 9/1133<br>430/137.13 |
| 2009/0291360 | A1 | 11/2009 | Kim et al. | |
| 2010/0323230 | A1 | 12/2010 | Lee et al. | |
| 2015/0056491 | A1 | 2/2015 | Zhao et al. | |
| 2015/0140403 | A1 | 5/2015 | Moon et al. | |
| 2016/0164065 | A1 | 6/2016 | Liu et al. | |
| 2018/0040868 | A1 | 2/2018 | Jang et al. | |
| 2018/0179108 | A1 * | 6/2018 | Yu | C08F 220/20 |
| 2019/0288257 | A1 | 9/2019 | Wong et al. | |
| 2021/0009731 | A1 * | 1/2021 | Avramidis | C08F 236/06 |
| 2021/0135315 | A1 | 5/2021 | Cheng et al. | |
| 2021/0234233 | A1 | 7/2021 | Fan | |

FOREIGN PATENT DOCUMENTS

| | | | | | |
|---|---|---|---|---|---|
| CN | 102942698 | A | * | 2/2013 | |
| CN | 103441230 | A | | 12/2013 | |
| CN | 103928650 | A | | 7/2014 | |
| CN | 103078077 | B | | 3/2015 | |
| CN | 104868084 | A | | 8/2015 | |
| CN | 108539095 | A | | 9/2018 | |
| CN | 110010831 | A | | 7/2019 | |
| CN | 111048786 | A | | 4/2020 | |
| CN | 111293262 | A | | 6/2020 | |
| CN | 111916624 | A | | 11/2020 | |
| IN | 105680086 | A | | 6/2016 | |
| IN | 106374112 | A | | 2/2017 | |
| JP | H1064549 | A | | 3/1998 | |
| JP | 2020-077618 | A | | 5/2020 | |
| KR | 20100121586 | A | * | 11/2010 | H01M 4/622 |
| KR | 20130136149 | A | | 12/2013 | |

OTHER PUBLICATIONS

Office Action dated Dec. 27, 2022, issued in counterpart CN Application No. 202080028645.X.(9 pages).

Notification to Grant Patent Right for Invention dated Dec. 28, 2023, issued in counterpart CN Application No. 202080028645.X with Partial English translation. (7 pages).

Extended Supplementary European Search Report dated Oct. 29, 2024, issued in counterpart Application No. 20964596.9. (10 pages).

L. Ren et al., The influence of the arrangement of styrene in methyl methacrylate/butadiene/styrene on the properties of PMMA/SAN/MBS blends, Polymers for Advanced Technologies, vol. 22, No. 3, Nov. 22, 2013, pp. 273-278; Cited in Extended Supplementary European Search Report dated Oct. 29, 2024. (6 pages).

* cited by examiner

POLYMER BINDER, LAMINATED POROUS FILM, BATTERY, AND ELECTRONIC APPARATUS

CROSS REFERENCE TO THE RELATED APPLICATIONS

This application is a continuation under 35 U.S.C. § 120 of international patent application PCT/CN2020/135004 filed on Dec. 9, 2020, the entire content of which is incorporated herein by reference.

TECHNICAL FIELD

This application relates to the field of battery technologies, and in particular, to a polymer binder, a laminated porous film using the polymer binder, a battery including the laminated porous film, and an electronic apparatus including the battery.

BACKGROUND

Lithium-ion batteries have been widely used in the field of consumer electronics by virtue of their advantages such as high specific energy, high working voltage, low self-discharge rate, small size, and low weight. However, with the rapid development of electric vehicles and mobile electronic devices, people have increasingly high requirements for performance (especially energy density and cycling performance) of batteries.

In the prior art, a high-adhesion separator generally needs to be disposed to tightly bond positive and negative electrode plates and the separator, so as to ensure bonding forces of interfaces between the separator and the electrode plates, reduce swelling and deformation of a battery, increase hardness of the battery, and ensure cycling capacity of the battery. However, because the high-adhesion separator is tightly bonded to the electrode plates, when a short circuit occurs inside the battery, heat is difficult to dissipate, easily leading to thermal runaway.

SUMMARY

In order to resolve the above shortcomings of the prior art, it is necessary to provide a polymer binder capable of avoiding thermal runaway.

It is further necessary to provide a laminated porous film using the foregoing polymer binder.

It is further necessary to provide a battery including the foregoing laminated porous film.

In addition, it is further necessary to provide an electronic apparatus including the foregoing battery.

This application provides a polymer binder including a copolymer formed by polymerizing a first monomer, a second monomer, and a third monomer, where a softening point of the polymer binder is in a range of 60° C. to 100° C.; where the first monomer includes at least one of compounds shown in structural formula (I) or structural formula (II), the second monomer includes at least one of compounds shown in structural formula (III) or structural formula (IV), and the third monomer includes at least one of compounds shown in structural formula (V):

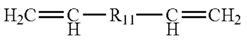
(I)

-continued (II)
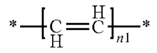

(III)
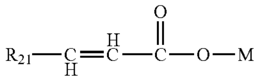

(IV)
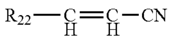

(V)
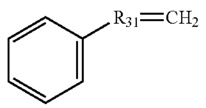

In the formula (I), $R_{11}$ is selected from an alkyl group having 0 to 3 carbon atoms; in the formula (II), n1 is an integer between 2 and 5; in the formula (III), $R_{21}$ is selected from hydrogen or an alkyl group having 1 to 5 carbon atoms, and M is hydrogen or an alkali metal cation; in the formula (IV), $R_{22}$ is selected from hydrogen or an alkyl group having 1 to 5 carbon atoms; and in the formula (V), $R_{31}$ is selected from an alkyl group having 1 to 5 carbon atoms.

In some embodiments of this application, the first monomer includes at least one of ethylene, propylene, butene, pentene, pentadiene, or butadiene, the second monomer includes at least one of methyl acrylate, ethyl acrylate, butyl acrylate, methyl methacrylate, ethyl methacrylate, methacrylic acid, methacrylonitrile, or butadiene-acrylonitrile, and the third monomer includes at least one of styrene, chlorostyrene, fluorostyrene, or methyl styrene.

In some embodiments of this application, based on a total mass of the copolymer binder, a mass ratio of the first monomer, the second monomer, and the third monomer is (15%-50%):(25%-75%):(10%-50%).

In some embodiments of this application, a melting point of the polymer binder is ≤120° C.

In some embodiments of this application, a particle size D50 of the polymer binder ranges from 200 nm to 3000 nm.

In some embodiments of this application, the polymer binder is a core-shell structure, and the core-shell structure includes a shell layer and a core coated with the shell layer.

In some embodiments of this application, a material of the core is an inorganic heat-resistant filler.

In some embodiments of this application, the inorganic heat-resistant filler includes at least one of aluminum oxide, magnesium hydroxide, calcium sulfate, or barium sulfate.

In some embodiments of this application, a thickness of the shell layer in the core-shell structure is 20 nm-1600 nm.

This application further provides a laminated porous film including a porous substrate and a porous coating, where the porous coating is disposed on at least one surface of the porous substrate, and the porous coating includes the foregoing polymer binder.

In some embodiments of this application, the porous coating further includes a thickener and a wetting agent, and a mass ratio of the polymer binder, the thickener, and the wetting agent is (98%-70%):(15%-1%):(15%-1%).

In some embodiments of this application, the porous coating further includes inorganic particles.

In some embodiments of this application, the porous coating further includes a thickener and a wetting agent, and a mass ratio of the inorganic particles, the polymer binder, the thickener, and the wetting agent is (97%-70%):(10%-1%):(10%-1%):(10%-1%).

In some embodiments of this application, a forward projection area of the porous coating accounts for 20%-100% of a forward projection area of the porous substrate.

This application further provides a battery including the foregoing laminated porous film.

This application further provides an electronic apparatus including the foregoing battery.

The polymer binder prepared in this application has a low softening point, and at high temperature (>120° C.), the polymer binder softens and melts. When the polymer binder is used in the porous coating of the laminated porous film, adhesion of the porous coating fails due to the polymer binder softening and melting at high temperature. If the laminated porous film including the porous coating is used in a battery and a short circuit inside the battery causes a rise in temperature, adhesion of the porous coating fails, leading to interface separation between the porous coating and positive and negative electrode plates and/or a porous substrate, thus blocking the current in a timely manner and preventing thermal runaway.

BRIEF DESCRIPTION OF DRAWINGS

To describe the technical solutions in embodiments of this application or in the prior art more clearly, the following briefly describes the accompanying drawings required for describing the embodiments. Apparently, the accompanying drawings in the following descriptions show merely some of the embodiments of this application, and persons of ordinary skill in the art may still derive other drawings from these accompanying drawings without creative efforts.

Figure 1:
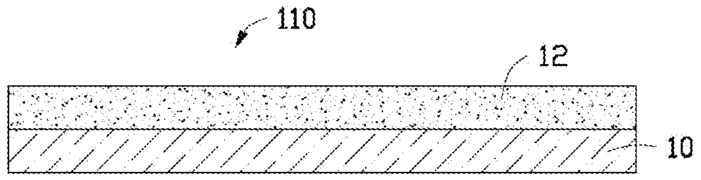
FIG. 1 is a cross-sectional view of a laminated porous film according to Embodiment 1 of this application.

REFERENCE SIGNS OF MAIN COMPONENTS laminated porous film 110, 111, 112, 113, 114, 115, 116, 117 porous substrate 10 porous coating 12, 13

This application will be further described with reference to the accompanying drawings in the following specific embodiments.

DETAILED DESCRIPTION

The following clearly and completely describes the technical solutions in the embodiments of this application with reference to the accompanying drawings in the embodiments of this application. It is clear that the described embodiments are only some but not all of the embodiments of this application. All other embodiments obtained by persons of ordinary skill in the art based on the embodiments of this application without creative efforts shall fall within the protection scope of this application.

It should be noted that when a component is deemed as being "disposed" on another component, it may be directly disposed on the another component, or there may be a component disposed in between.

Unless otherwise defined, all technical and scientific terms used herein shall have the same meanings as commonly understood by persons skilled in the art to which this application belongs. The terms used herein in the specification of this application are only used to describe specific embodiments, and are not intended to limit this application. The term "and/or" used herein includes any and all combinations of one or more related listed items.

This application provides a polymer binder. The polymer binder includes a copolymer formed by polymerizing a first monomer, a second monomer, and a third monomer. A softening point of the polymer binder is 60° C. to 100° C. The first monomer includes at least one of compounds shown in structural formula (I) or structural formula (II), the second monomer includes at least one of compounds shown in structural formula (III) or structural formula (IV), and the third monomer includes at least one of compounds shown in structural formula (V):

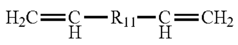

(I)

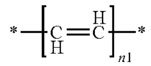

(II)

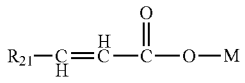

(III)

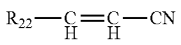

(IV)

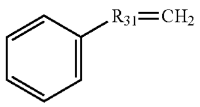

(V)

In the formula (I), $R_{11}$ is selected from an alkyl group having 0 to 3 carbon atoms; in the formula (II), n1 is an integer between 2 and 5; in the formula (III), $R_{21}$ is selected from hydrogen or an alkyl group having 1 to 5 carbon atoms, and M is hydrogen or an alkali metal cation; in the formula (IV), $R_{22}$ is selected from hydrogen or an alkyl group having 1 to 5 carbon atoms; and in the formula (V), $R_{31}$ is selected from an alkyl group having 1 to 5 carbon atoms.

Because the comonomers of the polymer binder provided in this application include the foregoing formula (I) or (II), (III) or (IV), and (V), the polymer binder has a low softening point, and at high temperature (>120° C.), the polymer binder softens and melts. In this way, when the polymer binder is used in a porous coating of a laminated porous film, adhesion of the porous coating fails due to the polymer binder softening and melting at high temperature. If the laminated porous film including the porous coating is used in a battery and a short circuit occurs inside the battery, causing a rise in temperature, adhesion of the porous coating fails, leading to interface separation between the porous coating and positive and negative electrode plates and/or a porous substrate, thus blocking the current in a timely manner and preventing thermal runaway.

A mass ratio of the first monomer, the second monomer, and the third monomer is (15%-50%):(25%-75%):(10%-50%). A melting point of the polymer binder is ≤120° C. The mass ratio of the first monomer, the second monomer, and the third monomer is controlled, so that the polymer binder has a low softening point (60° C.-100° C.) and a low melting point (≤120° C.) while maintaining a specified bonding force. When a mass percentage of the second monomer is higher than 75%, the softening point of the polymer binder is ≥120° C. At high temperature, bonding forces≥4 N/m are still maintained between the laminated porous film and the positive and negative electrode plates, such that heat in the battery is difficult to dissipate. When accumulated heat exceeds a critical point, the battery is prone to catch fire and fail. When a mass percentage of the second monomer is lower than 20%, at room temperature, bonding forces of interfaces between the laminated porous film and the positive and negative electrode plates are ≤4 N/m. When the battery is subjected to an external mechanical impact, the bonding forces between the laminated porous film and the positive and negative electrode plates are insufficient to resist the mechanical impact force, and the laminated porous film is likely to slide on the positive and negative electrode plates, causing direct contact between the positive and negative electrode plates, with a short circuit point generated, thereby leading to fire and explosion of the battery.

Specifically, the first monomer includes at least one of ethylene, propylene, butene, pentene, pentadiene, or butadiene. Molecules of the first monomer have no side chain group, interaction between molecular chains is small, and the molecular chains are flexible, which can appropriately lower glass transition temperature of the polymer, thereby enhancing a bonding force of the polymer.

Specifically, the second monomer includes at least one of methyl acrylate, ethyl acrylate, butyl acrylate, methyl methacrylate, ethyl methacrylate, methacrylic acid, methacrylonitrile, or butadiene-acrylonitrile. Side chains of the second monomer contain polar functional groups such as carboxylic acid and nitrile, making the polymer easily interact with polar functional groups on a surface of an adherend, thereby enhancing a bonding force between the polymer and the adherend.

Specifically, the third monomer includes at least one of styrene, chlorostyrene, fluorostyrene, or methyl styrene. Side chains of the third monomer contain a benzene ring. π bonds of the benzene ring form π-π interaction between molecular chains of the polymer, increasing intermolecular force; and steric hindrance of molecular chain movement increases, making overall temperature of the molecular chain movement of the polymer relatively high, thereby increasing the melting point of the polymer.

A particle size D50 of the polymer binder ranges from 200 nm to 3000 nm. In this way, the laminated porous film can have an appropriate thickness, so that the battery has an appropriate volumetric energy density. In addition, this facilitates transmission of lithium ions, thereby improving kinetic performance of a lithium-ion battery. Specifically, when the particle size of the polymer binder is >3000 nm, if the polymer binder is used in the porous coating, a thickness of the laminated porous film is increased, which in turn causes an increase in a thickness of the battery cell with a same battery capacity, thereby decreasing the volumetric energy density of the battery. When the particle size of the polymer binder is <200 nm, if the polymer binder is used in the porous coating, the polymer binder is likely to block pores of the porous substrate of the laminated porous film, which affects transmission of the lithium ions, thereby reducing the kinetic performance of the lithium ion battery.

Specifically, the polymer binder includes a spherical or quasi-spherical copolymer formed by suspension polymerization or emulsion polymerization of a first monomer, a second monomer, and a third monomer.

In some embodiments of this application, the polymer binder is a non-core-shell structure, and the non-core-shell structure is a solid spherical or quasi-spherical structure.

In some embodiments of this application, the polymer binder is a core-shell structure, and the core-shell structure is a hollow spherical or quasi-spherical structure. The core-shell structure includes a shell layer and a core coated with the shell layer.

In some embodiments of this application, a thickness of the shell layer in the core-shell structure is 20 nm-1600 nm.

In some embodiments of this application, a material of the core in the core-shell structure is an inorganic heat-resistant filler. The inorganic heat-resistant filler used as the core is capable of improving heat resistance of the laminated porous film and resisting piercing of foreign particles.

In some embodiments of this application, the inorganic heat-resistant filler is at least one of aluminum oxide, magnesium hydroxide, calcium sulfate, or barium sulfate.

Refer to FIG. 1 to FIG. 8. This application further provides a laminated porous film. The laminated porous film includes a porous substrate 10 and a porous coating 12 and/or 13. At least one surface of the porous substrate is coated with the porous coating 12 and/or 13, and the porous coating 12 and/or 13 includes the foregoing polymer binder. If the laminated porous film of this application is used in a battery and a short circuit occurs inside the battery, causing a rise in temperature, the binder in the porous coating 12 and/or 13 melts at high temperature and adhesion fails, leading to interface separation between the porous coating 12 and/or 13 and positive and negative electrode plates and/or the porous substrate 10, thus blocking the current in a timely manner and preventing thermal runaway.

Specifically, refer to FIG. 1. In some embodiments of this application, the laminated porous film 110 includes the porous substrate 10 and the porous coating 12. The porous coating 12 is formed on at least one surface of the porous substrate 10.

In some embodiments of this application, a material of the porous substrate 10 includes one or more materials of polyethylene (polyethylene, PE), polypropylene (Polypropylene, PP), polyethylene terephthalate (Polyethylene terephthalate, PET), cellulose, polyimide, polyvinylidene fluoride, and polytetrafluoroethylene. The porous substrate 10 may be a single-layer structure or a mixed multi-layer composite structure. A thickness of the porous substrate 10 is 3 μm to 20 μm.

In some embodiments of this application, the porous coating 12 includes the polymer binder, a thickener, and a wetting agent, and a mass ratio of the polymer binder, the thickener, and the wetting agent is (98%-70%):(15%-1%):(15%-1%).

The setting of the mass ratio of the polymer binder, the thickener, and the wetting agent in the porous coating 12 can not only make the porous coating be applied uniformly, facilitating transmission of lithium ions, but also bond the positive and negative electrode plates and the separator together, preventing the battery from swelling and deforming.

Specifically, when the mass percentage of the polymer binder in the porous coating 12 is >98%, in the process of preparing slurry, due to a small content of a dispersant, the polymer binder is unevenly dispersed and is likely to agglomerate into large particles, such that the porous coating 12 is unevenly coated, which affects transmission of the lithium ions, thereby reducing the kinetic performance. When the mass percentage of the polymer binder in the porous coating 12 is <70%, bonding forces between the porous coating 12 and the positive and negative electrode plates are ≤4 N/m. When the battery is subjected to an external mechanical impact, the bonding forces between the laminated porous film 110 and the positive and negative electrode plates are insufficient to resist the mechanical impact force, and the laminated porous film 110 is likely to slide on the positive and negative electrode plates, causing direct contact between the positive and negative electrode plates, with a short circuit point generated, thereby leading to fire and explosion of the battery cell.

Specifically, the thickener in the porous coating 12 is mainly used to increase a viscosity of a porous coating slurry, so that the porous coating slurry has good stability, preventing agglomeration and sedimentation of particles. The wetting agent is used to make contact between the polymer binder and thickener and water fuller, facilitating dispersion of the polymer binder.

In some embodiments of this application, a composition of the thickener in the porous coating 12 is at least one of sodium carboxymethyl cellulose, hydroxyethyl cellulose, methyl hydroxyethyl cellulose, ethyl hydroxyethyl cellulose, methyl hydroxypropyl cellulose, or polyurethane.

In some embodiments of this application, a composition of the wetting agent in the porous coating 12 is one or a mixture of more than two of sodium dodecyl benzene sulfonate, propylene glycol block polyether, octylphenol polyoxyethylene ether, sodium dodecyl sulfate, and sodium dodecyl sulfonate.

In some embodiments of this application, a forward projection area of the porous coating 12 accounts for 20%-100% of a forward projection area of the porous substrate 10. Preferably, the forward projection area of the porous coating 12 accounts for 70%-90% of the forward projection area of the porous substrate 10. In this way, the risk of short circuit of the battery cell caused by insufficient bonding forces between the laminated porous film and the positive and negative electrode plates can be avoided. Specifically, when the percentage of the forward projection area of the porous coating 12 to the forward projection area of the porous substrate 10 is ≤20%, the bonding forces between the porous coating 12 and the positive and negative electrode plates are ≤4 N/m. When the battery is subjected to an external mechanical impact, the bonding forces between the laminated porous film 110 and the positive and negative electrode plates are insufficient to resist the mechanical impact force, and the laminated porous film 110 is likely to slide on the positive and negative electrode plates, causing direct contact between the positive and negative electrode plates, with a short circuit point generated, thereby leading to fire and explosion of the battery cell.

In some embodiments of this application, the porous coating 12 is applied onto the porous substrate 10 using at least one method such as roll coating or spraying.

In some embodiments of this application, a thickness of the porous coating 12 is 200 nm-4000 nm.

Figure 2:
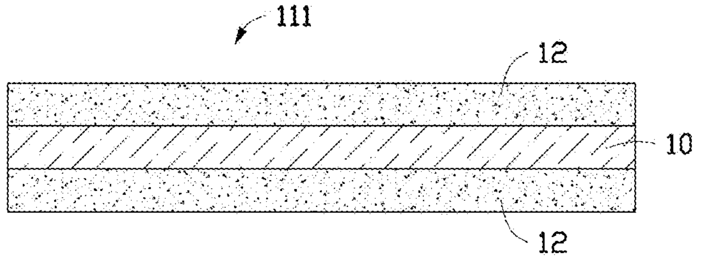
FIG. 2 is a cross-sectional view of a laminated porous film according to Embodiment 2 of this application.

Specifically, refer to FIG. 2. In some embodiments of this application, a laminated porous film 111 is further provided. The laminated porous film 111 is similar to the foregoing laminated porous film 110 in structure, and the difference between them is that the laminated porous film 111 includes two porous coatings 12 respectively formed on two back-to-back surfaces of the porous substrate 10.

Figure 3:
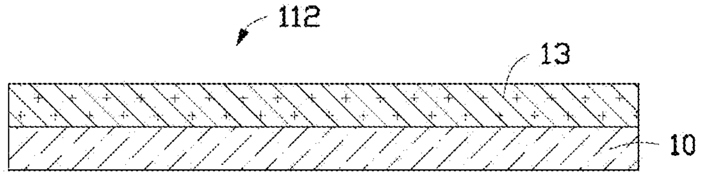
FIG. 3 is a cross-sectional view of a laminated porous film according to Embodiment 3 of this application.

Specifically, refer to FIG. 3. In some embodiments of this application, a laminated porous film 112 is further provided. The laminated porous film 112 is similar to the foregoing laminated porous film 110 in structure, and the difference between them is that the laminated porous film 112 includes the porous substrate 10 and one porous coating 13 formed on one surface of the substrate 10.

In some embodiments of this application, the porous coating 13 includes inorganic particles, the polymer binder, a thickener, and a wetting agent. A mass ratio of the inorganic particles, the polymer binder, the thickener, and the wetting agent is (97%-70%):(10%-1%):(10%-1%):(10%-1%).

The setting of the mass ratio of the inorganic particles, the polymer binder, the thickener, and the wetting agent in the porous coating 13 can not only make the porous coating 13 be applied uniformly, improving heat resistance of the laminated porous film 112 and resisting piercing of foreign particles, but also avoid the risk of short circuit of the battery cell caused by insufficient bonding forces between the laminated porous film 112 and the positive and negative electrode plates.

Specifically, the inorganic particles in the porous coating 13 are used to improve heat resistance of the laminated porous film 112 and resist piercing of foreign particles.

Specifically, the thickener in the porous coating 13 can increase a viscosity of a porous coating slurry, so that the porous coating slurry has good stability, preventing agglomeration and sedimentation of particles.

Specifically, the wetting agent in the porous coating 13 can make contact between the inorganic particles and polymer binder in the porous coating 13 and water fuller, facilitating dispersion of the polymer binder.

Specifically, in the porous coating 13, when the mass percentage of the polymer binder is >10%, a porosity of the porous coating 13 is decreased, which affects transmission of lithium ions, thereby reducing kinetic performance. When the mass percentage of the polymer binder is <1%, a bonding force between the porous coating 13 and the porous substrate 10 is ≤10 N/m, and the porous coating 13 is more likely to peel off from the porous substrate 10, such that the laminated porous film 112 without protection of the porous coating 13 is more likely to be pierced by particles, thereby leading to short circuit, fire, and explosion inside the battery cell.

In some embodiments of this application, the inorganic particles in the porous coating 13 include at least one of aluminum oxide, boehmite, barium sulfate, titanium dioxide, magnesium hydroxide, or the like.

In some embodiments of this application, a composition of the thickener in the porous coating 13 includes at least one of sodium carboxymethyl cellulose, hydroxyethyl cellulose, methyl hydroxyethyl cellulose, ethyl hydroxyethyl cellulose, methyl hydroxypropyl cellulose, or polyurethane.

In some embodiments of this application, a composition of the wetting agent in the porous coating 13 includes one or a mixture of more than two of sodium dodecyl benzene sulfonate, propylene glycol block polyether, octylphenol polyoxyethylene ether, sodium dodecyl sulfate, and sodium dodecyl sulfonate.

In some embodiments of this application, a forward projection area of the porous coating 13 accounts for 65%-100% of a forward projection area of the porous substrate 10. Specifically, when the percentage of the forward projection area of the porous coating 13 to the forward projection area of the porous substrate 10 is less than 65%, a bonding force between the porous coating 13 and the porous substrate 10 is small, and the porous coating 13 is more likely to peel off from the porous substrate 10, such that a region on the laminated porous film 112 without protection of the porous coating 13 is large and is more likely to be pierced by particles, increasing the risk of short circuit, fire, and explosion inside the battery cell.

In some embodiments of this application, a thickness of the porous coating 13 is 200 nm-5000 nm.

In some embodiments of this application, the porous coating 13 is applied onto the porous substrate 10 preferably using roll coating.

Figure 4:
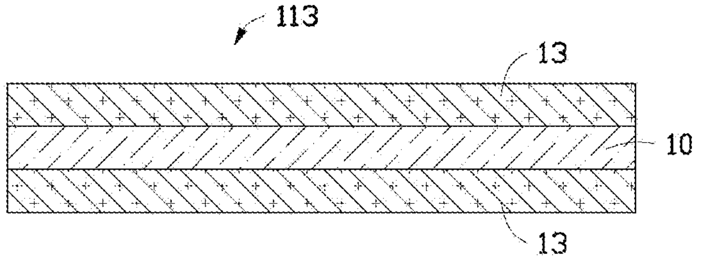
FIG. 4 is a cross-sectional view of a laminated porous film according to Embodiment 4 of this application.

Specifically, refer to FIG. 4. In some embodiments of this application, a laminated porous film 113 is further provided. The laminated porous film 113 is similar to the foregoing laminated porous film 112 in structure, and the difference between them is that the laminated porous film 113 includes two porous coatings 13 respectively formed on two back-to-back surfaces of the porous substrate 10.

Figure 5:
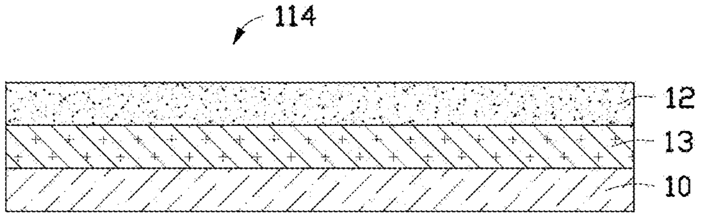
FIG. 5 is a cross-sectional view of a laminated porous film according to Embodiment 5 of this application.

Specifically, refer to FIG. 5. In some embodiments of this application, a laminated porous film 114 is further provided. The laminated porous film 114 is similar to the foregoing laminated porous film 113 in structure, and the difference between them is that the laminated porous film 114 includes one porous substrate 10, one porous coating 13 formed on one surface of the porous substrate 10, and one porous coating 12 formed on the porous coating 13.

In some embodiments of this application, the porous coating 12 is applied onto the porous coating 13 using at least one method such as roll coating or spraying.

In some embodiments of this application, a forward projection area of the porous coating 12 accounts for 20%-100% of a forward projection area of the porous coating 13. Preferably, the forward projection area of the porous coating 12 accounts for 70%-90% of the forward projection area of the porous coating 13.

Figure 6:
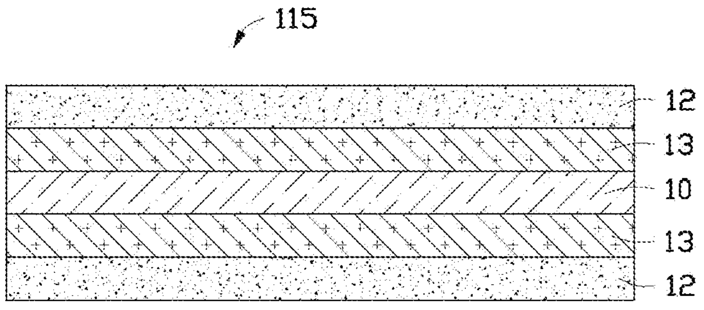
FIG. 6 is a cross-sectional view of a laminated porous film according to Embodiment 6 of this application.

Specifically, refer to FIG. 6. In some embodiments of this application, a laminated porous film 115 is further provided. The laminated porous film 115 is similar to the foregoing laminated porous film 114 in structure, and the difference between them is that the laminated porous film 115 includes one porous substrate 10, two porous coatings 13 respectively formed on two back-to-back surfaces of the porous substrate 10, and two porous coatings 12 respectively formed on the porous coatings 13.

Figure 7:
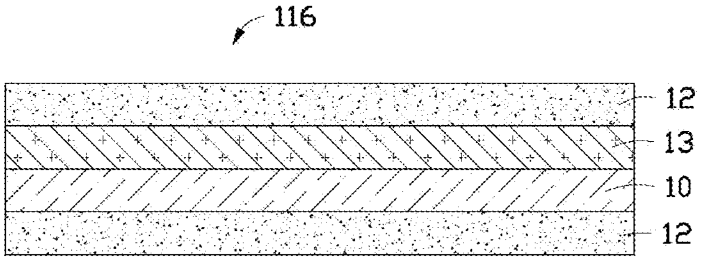
FIG. 7 is a cross-sectional view of a laminated porous film according to Embodiment 7 of this application.

Specifically, refer to FIG. 7. In some embodiments of this application, a laminated porous film 116 is further provided. The laminated porous film 116 is similar to the foregoing laminated porous film 114 in structure, and the difference between them is that the laminated porous film 116 includes one porous substrate 10, one porous coating 12 and one porous coating 13 formed on two back-to-back surfaces of the porous substrate 10, and another porous coating 12 formed on the porous coating 13.

Figure 8:
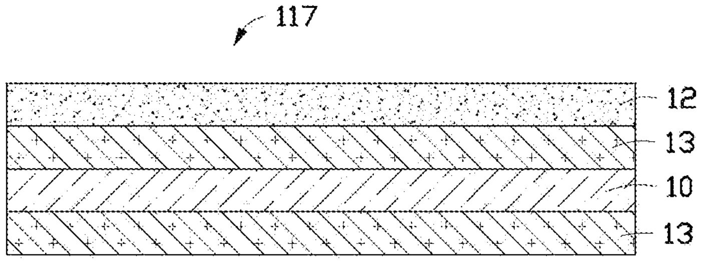
FIG. 8 is a cross-sectional view of a laminated porous film according to Embodiment 8 of this application.

Specifically, refer to FIG. 8. In some embodiments of this application, a laminated porous film 117 is further provided. The laminated porous film 117 is similar to the foregoing laminated porous film 114 in structure, and the difference between them is that the laminated porous film 117 includes two porous coatings 13 respectively formed on two back-to-back surfaces of the porous substrate 10, and one porous coating 12 formed on one of the porous coatings 13.

In some embodiments of this application, when the laminated porous film includes the porous coating 12, the porous coating 13 located between the porous substrate 10 and the porous coating 12 or located on a surface of the porous substrate 10 may alternatively not include the foregoing polymer binder, but uses a binder commonly used in the industry. Similarly, when the laminated porous film includes the porous coating 13, the porous coating 12 located on a surface of the porous substrate 10 and/or the porous coating 13 may not include the foregoing polymer binder, but uses a binder commonly used in the industry.

This application further provides a battery. The battery includes one positive electrode plate (not shown in the figure), one laminated porous film 110, one negative electrode plate (not shown in the figure), an electrolyte (not shown in the figure), and a housing (not shown in the figure). The positive electrode plate, the laminated porous film 110, the negative electrode plate, and the electrolyte are located inside the housing. The laminated porous film 110 is located between the positive electrode plate and the negative electrode plate and bonded to the positive electrode plate and the negative electrode plate. The positive electrode plate, the laminated porous film 110, and the negative electrode plate are immersed in the electrolyte. The battery provided in this application uses the foregoing laminated porous film as a separator, and the laminated porous film includes the porous coating using the foregoing polymer binder. When a short circuit occurs inside the battery, causing a rise in temperature, adhesion of the porous coating fails due to the polymer binder softening and melting at high temperature, in turn leading to interface separation between the porous coating and the positive and negative electrode plates and/or the porous substrate, thus blocking the current in a timely manner and preventing thermal runaway.

In some embodiments of this application, the battery is a lithium-ion battery.

In some embodiments of this application, the positive electrode plate includes a positive electrode current collector and a positive electrode active substance loaded on the positive electrode current collector.

The positive electrode active substance includes at least one of lithium iron phosphate, lithium manganate oxide, lithium nickel cobalt manganate, or lithium nickel cobalt aluminate.

The positive electrode active substance further includes a first binder and a conductive agent. The first binder may include at least one of polyvinylidene fluoride, vinylidene fluoride-hexafluoropropylene copolymer, polyamide, polyacrylonitrile, polyacrylic ester, polyacrylic acid, polyacrylic salt, sodium carboxymethyl cellulose, polyvinylpyrrolidone, polyvinyl ether, polymethyl methacrylate, polytetrafluoroethylene, or polyhexafluoropropylene. The conductive agent may include at least one of conductive carbon black, graphene, carbon nanotubes, carbon fibers, or Ketjen black.

In some embodiments of this application, the negative electrode plate includes a negative electrode current collector and a negative electrode active substance loaded on the negative electrode current collector.

In some embodiments of this application, the negative electrode active substance includes at least one of artificial graphite, natural graphite, soft carbon, hard carbon, mesocarbon microbeads, silicon, a silicon alloy, a silicon-carbon composite, a silicon-oxygen compound, lithium titanate, or niobium titanate.

In some embodiments of this application, a negative electrode active substance layer further includes a second binder, and the second binder is mixed with the negative electrode active substance. The second binder may include at least one of polyvinylidene fluoride, vinylidene fluoride-hexafluoropropylene copolymer, polyamide, polyacrylonitrile, polyacrylic ester, polyacrylic acid, polyacrylic salt, sodium carboxymethyl cellulose, polyvinylpyrrolidone, polyvinyl ether, polymethyl methacrylate, polytetrafluoroethylene, or polyhexafluoropropylene.

In some embodiments of this application, the electrolyte includes a solvent and a lithium salt. The solvent includes at least one of dimethyl carbonate, diethyl carbonate, ethyl methyl carbonate, ethyl propyl carbonate, ethyl butyl carbonate, dipropyl carbonate, ethylene carbonate, propylene carbonate, butylene carbonate, γ-butyrolacton, vinylene carbonate, or propylene sulfite.

In some embodiments of this application, in addition to the above, the electrolyte further includes other non-aqueous solvents, and the non-aqueous solvent may be a carbonate compound, a carboxylate compound, an ether compound, another organic solvent, or a combination thereof.

The carbonate compound may be a cyclic carbonate compound, a fluorocarbonate compound, or a combination thereof.

An example of the cyclic carbonate compound is ethylene carbonate (EC), propylene carbonate (PC), butylene carbonate (BC), vinyl ethylene carbonate (VEC), or a combination thereof. An example of the fluorocarbonate compound is fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, or a combination thereof.

An example of the carboxylate compound is methyl acetate, ethyl acetate, n-propyl acetate, tert-butyl acetate, methyl propionate, ethyl propionate, propyl propionate, decanolide, valerolactone, mevalonolactone, caprolactone, methyl formate, or a combination thereof.

An example of the ether compound is dibutyl ether, tetraglyme, diglyme, 1,2-dimethoxyethane, 1,2-diethoxyethane, ethoxymethoxy ethane, 2-methyltetrahydrofuran, tetrahydrofuran, or a combination thereof.

An example of the another organic solvent is dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or a combination thereof.

In some embodiments of this application, the lithium salt includes at least one of lithium hexafluorophosphate, lithium tetrafluoroborate, lithium hexafluoroarsenate, lithium perchlorate, or lithium triflate.

Specific examples and comparative examples below are used to describe this application. Methyl acrylate, butadiene, and styrene are used as raw materials of a polymer binder. Certainly, raw materials for preparing polymer binder are not limited to methyl acrylate, butadiene, and styrene.

Example 1

Basic Formulation of Polymer Binder:

By weight, a ratio of monomers was 15 parts of styrene, 30 parts of butadiene, and 55 parts of methyl acrylate. In addition, 2.1 parts of an emulsifier sodium dodecyl benzene sulfonate, 1.1 parts of an emulsifier octylphenol polyoxyethylene ether, 0.55 parts of an initiator ammonium persulfate, 0.015 parts of a chelating agent EDTA tetra sodium salt, 0.4 parts of a reducing agent sodium sulfite, 0.2 parts of a regulator dodecyl mercaptan, and 0.25 parts of a chain terminator hydroquinone were added as additives for a polymerization reaction.

Specific polymerization process is as follows:

Distilled water and the emulsifiers were fed into a reactor replaced by argon, then a reducing agent, chelating agent, regulator, styrene, and methyl acrylate were added into the reactor, and argon was passed through the reactor for 20 min to replace oxygen and a mixture was refluxed. The mixture was stirred and pre-emulsified for 1 h (40° C.-50° C.). The temperature of the reactor was rapidly increased to 78° C. 30% of the initiator was first added, and the temperature of the reactor was stabilized at 80° C.-84° C.; then, butadiene in a metering tank was added into the reactor with argon, the remaining initiator was added at the same time, completion of the addition was controlled within 30 min, and the number of rotations of the stirrer was controlled to be 150 r/min; and a time for polymerization was 8-12 h, and a monomer conversion rate was controlled to be 75%. Finally, a chain terminator was added to stop the reaction. After the reaction was completed, the monomers were removed from the emulsion, and a required binder emulsion was obtained.

Preparation of laminated porous film: First, a polymer binder (methyl acrylate:butadiene:styrene=55%:30%:15%) with a mass percentage of 95% and a melting point ≤120° C. was added into a stirrer and stirred to obtain a uniform slurry. Then, with a mass percentage of 5%, an auxiliary binder, a thickener, and a wetting agent were added into the slurry and stirred to a uniform mixture. Finally, deionized water was added to obtain an adhesive coating slurry, and a viscosity of the adhesive coating slurry was adjusted to 30 MPa·s-500 MPa·s. The adhesive coating slurry was applied onto a laminated porous film with a ceramic coating and dried in an oven, to form a laminated porous film with a ceramic coating and an adhesive coating. An acrylic binder was used as a binder for the ceramic coating, a cover rate of the adhesive coating on the ceramic coating was 80%, and a particle size of the polymer binder was 1000 nm. Herein, the adhesive coating was equivalent to the foregoing porous coating 12, and the ceramic coating was equivalent to a common porous coating 13 using a binder commonly used in the industry.

Preparation of positive electrode plate: Lithium cobalt oxide ($LiCoO_2$), conductive carbon (Super-P), and polyvinylidene fluoride (PVDF) were mixed at a mass ratio of 95:2:3 in a solvent deionized water, and stirred to obtain a uniform positive electrode slurry. The slurry was applied onto an aluminum foil of 12 μm, followed by drying, cold pressing, cutting, and tab welding, to obtain a positive electrode plate.

Preparation of negative electrode plate: Natural graphite, conductive carbon (Super-P), and sodium carboxymethyl cellulose (CMC) were mixed at a mass ratio of 95:2:3 in a solvent N-methylpyrrolidone and stirred to obtain a uniform negative electrode slurry. The negative electrode slurry was applied onto a copper foil of 12 μm, followed by drying, cold pressing, cutting, and tab welding, to obtain a negative electrode plate.

Preparation of electrolyte: In a dry argon atmosphere, first, organic solvents ethylene carbonate (EC), ethyl methyl carbonate (EMC), and diethyl carbonate (DEC) were mixed at a mass ratio of EC:EMC:DEC=30:50:20, and then a lithium salt lithium hexafluorophosphate ($LiPF_6$) was added into the organic solvents for dissolving and mixing to uniformity, to obtain an electrolyte with a concentration of the lithium salt being 1.15 M.

Preparation of battery: The positive electrode plate, negative electrode plate, and laminated porous film prepared above were wound in sequence to form a battery, and the battery was sealed at the top and side with an aluminum-plastic film, with an electrolyte injection opening left. The electrolyte was injected from the electrolyte injection opening which was then sealed. Then, the electrode and the separator were bonded by hot pressing, followed by processes such as formation and grading, to obtain a lithium-ion battery.

Example 2

The difference from example 1 was that in the polymer binder, methyl acrylate:styrene:butadiene=90%:5%:5%.

Example 3

The difference from example 1 was that in the polymer binder, methyl acrylate:styrene:butadiene=80%:10%:10%.

Example 4

The difference from example 1 was that in the polymer binder, methyl acrylate:styrene:butadiene=75%:15%:10%.

Example 5

The difference from example 1 was that in the polymer binder, methyl acrylate:styrene:butadiene=55%:15%:30%.

Example 6

The difference from example 1 was that in the polymer binder, methyl acrylate:styrene:butadiene=40%:50%:10%.

Example 7

The difference from example 1 was that in the polymer binder, methyl acrylate:styrene:butadiene=40%:10%:50%.

Example 8

The difference from example 1 was that in the polymer binder, methyl acrylate:styrene:butadiene=30%:60%:10%.

Example 9

The difference from example 1 was that in the polymer binder, methyl acrylate:styrene:butadiene=30%:10%:60%.

Example 10

The difference from example 1 was that the cover rate of the adhesive coating on the ceramic coating was 50%.

Example 11

The difference from example 1 was that the cover rate of the adhesive coating on the ceramic coating was 60%.

Example 12

The difference from example 1 was that the cover rate of the adhesive coating on the ceramic coating was 70%.

Example 13

The difference from example 1 was that the cover rate of the adhesive coating on the ceramic coating was 90%.

Example 14

The difference from example 1 was that the cover rate of the adhesive coating on the ceramic coating was 100%.

Example 15

The difference from example 1 was that the percentage of the polymer binder in the adhesive coating was 60%.

Example 16

The difference from example 1 was that the percentage of the polymer binder in the adhesive coating was 70%.

Example 17

The difference from example 1 was that the percentage of the polymer binder in the adhesive coating was 75%.

Example 18

The difference from example 1 was that the percentage of the polymer binder in the adhesive coating was 98%.

Example 19

The difference from example 1 was that the percentage of the polymer binder in the adhesive coating was 100%.

Example 20

The difference from example 1 was that the particle size of the polymer binder was 50 nm.

Example 21

The difference from example 1 was that the particle size of the polymer binder was 200 nm.

Example 22

The difference from example 1 was that the particle size of the polymer binder was 2000 nm.

Example 23

The difference from example 1 was that the particle size of the polymer binder was 3000 nm.

Example 24

The difference from example 1 was that the particle size of the polymer binder was 4000 nm.

Example 25

The difference from example 1 was that:

Preparation of laminated porous film: First, a wetting agent with a mass percentage of 1% was added into a stirrer and stirred to uniformity. Then, inorganic particles with a mass percentage of 95% were added in two times and stirred to uniformity, and a polymer binder (methyl acrylate:butadiene:styrene=55%:30%:15%) with a mass percentage of 4% and a thickener were added into the slurry and stirred to a uniform mixture. Finally, deionized water was added to obtain a ceramic coating slurry, and a viscosity of the ceramic coating slurry was adjusted to 30 MPa·s-500 MPa·s.

The ceramic coating slurry was applied onto the substrate layer and dried in an oven, and then the adhesive coating was applied onto the ceramic coating and dried in the oven, to form a laminated porous film with a ceramic coating and an adhesive coating. The adhesive coating was an oily polyvinylidene fluoride (Polyvinylidene Fluoride, PVDF) coating, and the particle size of the polymer binder was 1000 nm. In this example, the adhesive coating was the porous coating 12 in example 1, and the ceramic coating was the porous coating 13 including the polymer binder.

Example 26

The difference from example 25 was that the percentage of the polymer binder in the ceramic coating was 0.5%.

Example 27

The difference from example 25 was that the percentage of the polymer binder in the ceramic coating was 1.0%.

Example 28

The difference from example 25 was that the percentage of the polymer binder in the ceramic coating was 8.0%.

Example 29

The difference from example 25 was that the percentage of the polymer binder in the ceramic coating was 10.0%.

Example 30

The difference from example 25 was that the percentage of the polymer binder in the ceramic coating was 15.0%.

Example 31

The difference from example 25 was that the particle size of the polymer binder was 50 nm.

Example 32

The difference from example 25 was that the particle size of the polymer binder was 200 nm.

Example 33

The difference from example 25 was that the particle size of the polymer binder was 2000 nm.

Example 34

The difference from example 25 was that the particle size of the polymer binder was 3000 nm.

Example 35

The difference from example 25 was that the particle size of the polymer binder was 4000 nm.

Comparative Example 1

The difference from example 1 was that: First, 70% of PVDF particles were added into an organic solvent in batches, and then stirred with a stirrer. After the mixture was stirred to uniformity, 30% of ceramic powder and an additive were added into the slurry and stirred to obtain a uniform mixed slurry. The mixed slurry was applied onto the substrate layer and dried in an oven, to form a laminated porous film. The cover rate of the adhesive coating on the ceramic coating was 100%.

Comparative Example 2

The difference from example 25 was that: First, a 1 wt % wetting agent was added into a stirrer and stirred to uniformity. Then, inorganic particles with a mass percentage of 95% were added in two times and stirred to uniformity, and an acrylic binder with a mass percentage of 4% and a thickener were added into the slurry and stirred to a uniform mixture. Finally, deionized water was added, and a viscosity of the slurry was adjusted to 30 MPa·s-500 MPa·s.

Comparative Example 3

The difference from example 1 was that the polymer binder contained no third monomer, and in the polymer binder, methyl acrylate:butadiene=90%:10%.

Comparative Example 4

The difference from example 1 was that the polymer binder contained no first monomer or third monomer. The polymer binder was poly(methyl acrylate).

The laminated porous films prepared in examples 1 to 35 and Comparative examples 1 to 4 were respectively tested for a wet pressing bonding force between the laminated porous film and the positive and negative electrode plates using a 180° C. peel test standard: The laminated porous film and the positive and negative electrode plates were cut into samples of 54.2 mm×72.5 mm, and the laminated porous film and the positive and negative electrode plates were recombined and encapsulated with an aluminum-plastic film, followed by electrolyte injection, and then hot pressed using a hot press under the following conditions: temperature was 85° C., pressure was 1 MPa, and time was 60 min; and the hot pressed samples were cut into strips of 15 mm×54.2 mm, and respectively tested for the bonding force according to the 180° C. peel test standard.

The batteries prepared in examples 1 to 35 and comparative examples 1 to 4 were subjected to a hot-box test: The battery was charged to a full charge voltage at a constant current of 0.7 C, and then charged to a current of 0.02 C at a constant voltage; an open-circuit voltage and alternating current internal resistance of the battery cell were recorded before the test, and the appearance of the battery was checked and photographed; and the temperature was increased to a specified temperature at a rate of 5° C./min±2° C./min and kept for 60 min, and the surface temperature rise and voltage of the battery cell were recorded. After the test was completed, the OCV and IMP were recorded, and the appearance of the battery was checked and photographed.

The batteries prepared in examples 1 to 35 and comparative examples 1 and 2 were measured for a discharge rate of the battery cell using a discharge method: The battery was charged to 4.45 V at a constant current of 0.5 C, then charged to a current of 0.05 C at a constant voltage, left standing for 5 min, and sequentially discharged at 0.2 C, 0.5 C, 1 C, 1.5 C, and 2 C. The discharge rates were calculated.

The parameters and test results involved in examples 1 to 35 and comparative examples 1 to 4 are recorded in Table 1. The porous coatings in examples 1 to 24 correspond to the porous coating 12. The porous coatings in examples 25 to 35 correspond to the porous coating 13.

TABLE 1

| | Percentage of second monomer | Percentage of first monomer | Percentage of third monomer | Cover rate of porous coating | Percentage of polymer binder in porous coating | Particle size of polymer binder (nm) | Wet pressing bonding force film and electrode plate at RT between laminated porous (N/m) | Wet pressing bonding force film and membrane at 120° C. between laminated porous (N/m) | DC rate (2C) | 140° C. hot-box pass rate |
|---|---|---|---|---|---|---|---|---|---|---|
| Example 1 | 55% | 30% | 15% | 80% | 95% | 1000 | 10.8 | 0.4 | 77.60% | 5/5 |
| Example 2 | 90% | 5% | 5% | 80% | 95% | 1000 | 13.9 | 10.6 | 78.90% | 0/5 |
| Example 3 | 80% | 10% | 10% | 80% | 95% | 1000 | 12.2 | 6.7 | 78.70% | 0/5 |
| Example 4 | 75% | 15% | 10% | 80% | 95% | 1000 | 11.6 | 3.3 | 78.10% | 1/5 |
| Example 5 | 55% | 15% | 30% | 80% | 95% | 1000 | 9.8 | 5.1 | 77.90% | 2/5 |
| Example 6 | 40% | 50% | 10% | 80% | 95% | 1000 | 8.9 | 1.7 | 75.40% | 4/5 |
| Example 7 | 40% | 10% | 50% | 80% | 95% | 1000 | 4.5 | 1.3 | 77.50% | 4/5 |
| Example 8 | 30% | 60% | 10% | 80% | 95% | 1000 | 3.8 | 0.3 | 75.10% | 5/5 |
| Example 9 | 30% | 10% | 60% | 80% | 95% | 1000 | 2.3 | 1.1 | 78.30% | 4/5 |
| Example 10 | 55% | 30% | 15% | 50% | 95% | 1000 | 3.1 | 0 | 80.10% | 5/5 |
| Example 11 | 55% | 30% | 15% | 60% | 95% | 1000 | 4.7 | 0 | 79.40% | 5/5 |
| Example 12 | 55% | 30% | 15% | 70% | 95% | 1000 | 7.3 | 0.2 | 78.40% | 5/5 |
| Example 1 | 55% | 30% | 15% | 80% | 95% | 1000 | 10.8 | 0.4 | 77.60% | 5/5 |
| Example 13 | 55% | 30% | 15% | 90% | 95% | 1000 | 11.9 | 0.5 | 76.90% | 5/5 |
| Example 14 | 55% | 30% | 15% | 100% | 95% | 1000 | 13.1 | 0.4 | 73.40% | 5/5 |
| Example 15 | 55% | 30% | 15% | 80% | 60% | 1000 | 3.1 | 0 | 80.70% | 5/5 |
| Example 16 | 55% | 30% | 15% | 80% | 70% | 1000 | 5.6 | 0 | 79.10% | 5/5 |
| Example 17 | 55% | 30% | 15% | 80% | 75% | 1000 | 7.9 | 0.2 | 78.30% | 5/5 |
| Example 18 | 55% | 30% | 15% | 80% | 98% | 1000 | 11.9 | 0.6 | 77.40% | 5/5 |
| Example 19 | 55% | 30% | 15% | 80% | 100% | 1000 | 12.9 | 0.9 | 76.50% | 5/5 |
| Example 20 | 55% | 30% | 15% | 80% | 95% | 50 | 11.5 | 0.5 | 63.70% | 5/5 |
| Example 21 | 55% | 30% | 15% | 80% | 95% | 200 | 11 | 0.4 | 76.10% | 5/5 |
| Example 22 | 55% | 30% | 15% | 80% | 95% | 2000 | 10.4 | 0.3 | 78.90% | 5/5 |
| Example 23 | 55% | 30% | 15% | 80% | 95% | 3000 | 10 | 0.5 | 79.60% | 5/5 |
| Example 24 | 55% | 30% | 15% | 80% | 95% | 4000 | 9.8 | 0 | 81.70% | 5/5 |
| Example 25 | 55% | 30% | 15% | — | 4% | 1000 | 22.3 | 0.5 | 75.90% | 5/5 |
| Example 26 | 55% | 30% | 15% | — | 0.50% | 1000 | 7.8 | 0 | 77.10% | 5/5 |
| Example 27 | 55% | 30% | 15% | — | 1% | 1000 | 11.4 | 0 | 76.40% | 5/5 |
| Example 28 | 55% | 30% | 15% | — | 8% | 1000 | 33.2 | 0.7 | 75.10% | 5/5 |
| Example 29 | 55% | 30% | 15% | — | 10% | 1000 | 39.4 | 0.8 | 73.60% | 5/5 |
| Example 30 | 55% | 30% | 15% | — | 15% | 1000 | 42.4 | 0.7 | 72.90% | 5/5 |
| Example 31 | 55% | 30% | 15% | — | 4% | 50 | 23.1 | 0.5 | 63.70% | 5/5 |
| Example 32 | 55% | 30% | 15% | — | 4% | 200 | 22.7 | 0.4 | 74.80% | 5/5 |
| Example 33 | 55% | 30% | 15% | — | 4% | 2000 | 21.9 | 0.4 | 76.10% | 5/5 |
| Example 34 | 55% | 30% | 15% | — | 4% | 3000 | 21.3 | 0.5 | 76.90% | 5/5 |
| Example 35 | 55% | 30% | 15% | — | 4% | 4000 | 21.1 | 0 | 77.10% | 5/5 |
| Comparative example 1 | — | Oily PVDF | Oily PVDF | | — | — | 11.6 | 10.2 | 74.90% | 0/5 |
| Comparative example 2 | — | 100% | — | — | — | — | 23.5 | 19.8 | 74.90% | 0/5 |
| Comparative example 3 | 90% | 10% | — | 80% | 95% | 1000 | 14.9 | 10.8 | 77.90% | 0/5 |
| Comparative example 4 | 100% | — | — | 80% | 95% | 1000 | 15.4 | 11.6 | 76.90% | 0/5 |

It can be learned from Table 1 that, as compared with comparative examples 1 to 4, because the laminated porous films in examples 1 to 35 are added with the polymer binders, the laminated porous films and batteries in examples 1 to 35 have a good bonding force and a high hot-box pass rate.

It can be learned from examples 1 to 9 that in a case that the cover rate of the adhesive coating, and the percentage and particle size of the polymer binder in the adhesive coating remain unchanged, if the component percentage of poly(methyl acrylate) (second monomer) is excessively high, the hot-box pass rate is affected; and if the component percentage of poly(methyl acrylate) (second monomer) is excessively low, the bonding forces of the interfaces between the laminated porous film and the electrode plates are decreased. It can be learned from examples 1 to 9 that in the polymer binder, the optimal ratio of methyl acrylate (second monomer):butadiene (first monomer): styrene (third monomer) is 55%:30%:15%.

It can be learned from examples 10 to 14 that in a case that the components of the polymer binder, and the percentage and particle size of the polymer binder in the adhesive coating remain unchanged, a higher cover rate of the adhesive coating means a stronger bonding force but a lower rate; and a lower cover rate means better rate performance but a weaker bonding force.

It can be learned from examples 15 to 19 that in a case that the components of the polymer binder, the cover rate of the adhesive coating, and the particle size remain unchanged, if the percentage of the polymer binder in the adhesive coating is excessively high, rate performance of the battery cell is affected; and if the percentage of the polymer binder in the adhesive coating is excessively low, the bonding forces of the interfaces between the laminated porous film and the electrode plates are affected.

It can be learned from examples 20 to 24 that in a case that the components of the polymer binder, the cover rate of the adhesive coating, and the percentage of the polymer binder in the adhesive coating remain unchanged, if the particle size of the polymer binder is excessively large, energy density of the battery cell is affected; and if the particle size is excessively small, the rate performance of the battery cell is affected.

It can be learned from examples 25 to 30 that in a case that the components and particle size of the polymer binder remain unchanged, if the percentage of the polymer binder in the ceramic coating is excessively high, the rate performance of the battery cell is affected; and if the percentage of the polymer binder in the ceramic coating is excessively low, the bonding force of the CCS coating is affected.

It can be learned from examples 31 to 35 that in a case that the components of the polymer binder, the cover rate of the adhesive coating, and the percentage of the polymer binder in the ceramic coating remain unchanged, if the particle size of the polymer binder is excessively large, the energy density of the battery cell is affected; and if the particle size is excessively small, the rate performance of the battery cell is affected.

The foregoing descriptions are merely preferred embodiments of this application, and do not limit this application in any form. Although this application is disclosed as above with preferred embodiments, the embodiments are not intended to limit this application. Some equivalent changes such as alterations or modifications made by persons skilled in the art using the technical content disclosed above without departing from the scope of the technical solutions of this application are considered as equivalent embodiments. However, any simple alteration, equivalent change, and modification made to the foregoing embodiments based on a substantial technology of this application without departing from the content of the technical solutions of this application still fall within the scope of the technical solutions of this application.

What is claimed is:

1. A polymer binder, comprising: a copolymer formed by polymerizing a first monomer, a second monomer, and a third monomer; wherein a softening point of the polymer binder is in a range of 60° C. to 100° C.; wherein the first monomer comprises at least one of compounds shown in structural formula (I) or structural formula (II), the second monomer comprises at least one of compounds shown in structural formula (III) or structural formula (IV), and the third monomer comprises at least one of compounds shown in structural formula (V):

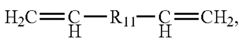
(I)

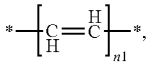
(II)

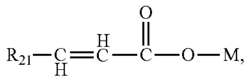
(III)

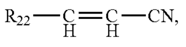
(IV)

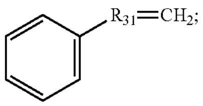
(V)

wherein in the formula (I), $R_{11}$ is selected from an alkyl group having 0 to 3 carbon atoms; in the formula (II), n1 is an integer between 2 and 5; in the formula (III), $R_{21}$ is selected from hydrogen or an alkyl group having 1 to 5 carbon atoms, and M is hydrogen, alkyl, or an alkali metal cation; in the formula (IV), $R_{22}$ is selected from hydrogen or an alkyl group having 1 to 5 carbon atoms; and in the formula (V), $R_{31}$ is selected from an alkyl group having 1 to 5 carbon atoms; wherein based on a total mass of the copolymer, a mass ratio of the first monomer, the second monomer, and the third monomer is (15%-50%):(25%-75%):(10%-50%).

2. The polymer binder according to claim 1, wherein the first monomer comprises at least one of ethylene, propylene, butene, pentene, pentadiene, or butadiene; the second monomer comprises at least one of methyl acrylate, ethyl acrylate, butyl acrylate, methyl methacrylate, ethyl methacrylate, methacrylic acid, methacrylonitrile, or butadiene-acrylonitrile; and the third monomer comprises at least one of styrene, chlorostyrene, fluorostyrene, or methyl styrene.

3. The polymer binder according to claim 1, wherein a melting point of the polymer binder is ≤120° C.

4. The polymer binder according to claim 1, wherein a particle size D50 of the polymer binder ranges from 200 nm to 3000 nm.

5. The polymer binder according to claim 1, wherein the polymer binder is a core-shell structure, and the core-shell structure comprises a shell layer and a core coated with the shell layer.

6. The polymer binder according to claim 5, wherein the core of the core-shell structure comprises an inorganic heat-resistant filler encapsulated by the shell layer.

7. The polymer binder according to claim 6, wherein the inorganic heat-resistant filler comprises at least one of aluminum oxide, magnesium hydroxide, calcium sulfate, or barium sulfate.

8. The polymer binder according to claim 5, wherein a thickness of the shell layer in the core-shell structure is 20 nm-1600 nm.

9. A laminated porous film, comprising a porous substrate and a porous coating, wherein at least one surface of the porous substrate is coated with the porous coating, and the porous coating comprises a polymer binder; the polymer binder comprises a copolymer formed by polymerizing a first monomer, a second monomer, and a third monomer, wherein a softening point of the polymer binder is in a range of 60° C. to 100° C.; wherein the first monomer comprises at least one of compounds shown in structural formula (I) or structural formula (II), the second monomer comprises at least one of compounds shown in structural formula (III) or structural formula (IV), and the third monomer comprises at least one of compounds shown in structural formula (V):

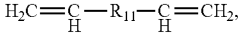
(I)

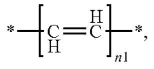
(II)

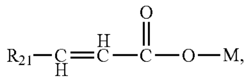
(III)

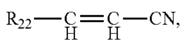
(IV)

-continued (V)

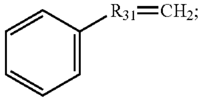

wherein in the formula (I), Ru is selected from an alkyl group having 0 to 3 carbon atoms; in the formula (II), n1 is an integer between 2 and 5; in the formula (III), $R_{21}$ is selected from hydrogen or an alkyl group having 1 to 5 carbon atoms, and M is hydrogen or an alkali metal cation; in the formula (IV), $R_{22}$ is selected from hydrogen or an alkyl group having 1 to 5 carbon atoms; and in the formula (V), $R_{31}$ is selected from an alkyl group having 1 to 5 carbon atoms;

wherein based on a total mass of the copolymer, a mass ratio of the first monomer, the second monomer, and the third monomer is (15%-50%):(25%-75%):(10%-50%).

10. The laminated porous film according to claim 9, wherein the porous coating further comprises a thickener and a wetting agent, and a mass ratio of the polymer binder, the thickener, and the wetting agent is (98%-70%):(15%-1%):(15%-1%).

11. The laminated porous film according to claim 9, wherein the porous coating further comprises inorganic particles.

12. The laminated porous film according to claim 11, wherein the porous coating further comprises a thickener and a wetting agent, and a mass ratio of the inorganic particles, the polymer binder, the thickener, and the wetting agent is (97%-70%):(10%-1%):(10%-1%):(10%-1%).

13. The laminated porous film according to claim 9, wherein a forward projection area of the porous coating accounts for 20%-100% of a forward projection area of the porous substrate.

14. A battery, wherein the battery comprises a laminated porous film, the laminated porous film comprises a porous substrate and a porous coating, wherein at least one surface of the porous substrate is coated with the porous coating, and the porous coating comprises a polymer binder, the polymer binder comprises a copolymer formed by polymerizing a first monomer, a second monomer, and a third monomer, wherein a softening point of the polymer binder is 60° C. to 100° C.; wherein the first monomer comprises at least one of compounds shown in structural formula (I) or structural formula (II), the second monomer comprises at least one of compounds shown in structural formula (III) or structural formula (IV), and the third monomer comprises at least one of compounds shown in structural formula (V):

(I)

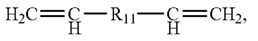

(II)

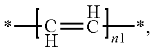

(III)

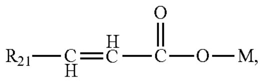

(IV)

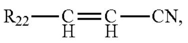

(V)

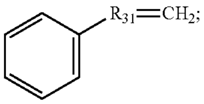

wherein in the formula (I), Ru is selected from an alkyl group having 0 to 3 carbon atoms; in the formula (II), n1 is an integer between 2 and 5; in the formula (III), $R_{21}$ is selected from hydrogen or an alkyl group having 1 to 5 carbon atoms, and M is hydrogen or an alkali metal cation; in the formula (IV), $R_{22}$ is selected from hydrogen or an alkyl group having 1 to 5 carbon atoms; and in the formula (V), $R_{31}$ is selected from an alkyl group having 1 to 5 carbon atoms;

wherein based on a total mass of the copolymer, a mass ratio of the first monomer, the second monomer, and the third monomer is (15%-50%):(25%-75%):(10%-50%).

15. The battery according to claim 14, wherein the first monomer comprises at least one of ethylene, propylene, butene, pentene, pentadiene, or butadiene; the second monomer comprises at least one of methyl acrylate, ethyl acrylate, butyl acrylate, methyl methacrylate, ethyl methacrylate, methacrylic acid, methacrylonitrile, or butadiene-acrylonitrile; and the third monomer comprises at least one of styrene, chlorostyrene, fluorostyrene, or methyl styrene.

16. The battery according to claim 14, wherein a melting point of the polymer binder is ≤120° C.

17. The battery according to claim 14, wherein a particle size D50 of the polymer binder ranges from 200 nm to 3000 nm.

18. The battery according to claim 14, wherein the polymer binder is a core-shell structure, and the core-shell structure comprises a shell layer and a core coated with the shell layer.

* * * * *